United States Patent
Savarmand et al.

(10) Patent No.: US 8,573,737 B2
(45) Date of Patent: Nov. 5, 2013

(54) REDUCTION OF MISTING IN HIGH SPEED OFFSET PRINTING

(75) Inventors: Saeid Savarmand, Bergenfield, NJ (US); Richard R. Durand, Jr., Oradell, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 13/266,089

(22) PCT Filed: Apr. 28, 2010

(86) PCT No.: PCT/US2010/032727
§ 371 (c)(1),
(2), (4) Date: Oct. 24, 2011

(87) PCT Pub. No.: WO2010/126981
PCT Pub. Date: Nov. 4, 2010

(65) Prior Publication Data
US 2012/0044295 A1    Feb. 23, 2012

Related U.S. Application Data

(60) Provisional application No. 61/173,311, filed on Apr. 28, 2009.

(51) Int. Cl.
*B41J 2/165* (2006.01)

(52) U.S. Cl.
USPC .......................................................... 347/34

(58) Field of Classification Search
USPC ............................................ 347/34, 95, 100
See application file for complete search history.

(56) References Cited

U.S. PATENT DOCUMENTS

2009/0244142 A1* 10/2009 Okada ............................ 347/13

FOREIGN PATENT DOCUMENTS

EP    1524304 A1    4/2005
WO    WO 01/51574 A1    7/2001

OTHER PUBLICATIONS

Taschenbuch Kunststoff-Pruftechnik -(Paperback Plastic Pruftechnik) Author: Roger P. Brown, et al. 1984, pp. 193-194 only.*
R. P. Brown, "Taschenbuch Kunststoff-Prüftechnik", Carl Hanser Verlag, München Wien, XP002592107, ISBN: 3-446-14052-2, Jan. 1, 1990, pp. 193-195, 1984 edition considered.

* cited by examiner

*Primary Examiner* — Matthew Luu
*Assistant Examiner* — Michael Konczal
(74) *Attorney, Agent, or Firm* — Kramer Levin Naftalis & Frankel LLP

(57) ABSTRACT

An ink or coating composition is rheologically tested at three or more temperatures which substantially cover the anticipated range of printing operation temperatures expected to be encountered during printing to determine the value of the rheological parameters viscous modulus, phase angle and phase-angle slope, and to identify values of these parameters encountered during printing around which the structural behavior of the ink or coating changes. An ink composition that has a phase angle of at least 55°, a viscous modulus of at least 150 Pa, and a phase-angle slope of at least −0.5°/° C. exhibits low misting when employed in high speed printing apparatus.

5 Claims, 3 Drawing Sheets

REDUCTION OF MISTING IN HIGH SPEED OFFSET PRINTING

This application is a national stage application of PCT/US2010/032727, filed Apr. 28, 2010, which claims priority from U.S. Provisional Patent Application No. 61/173,311, filed Apr. 28, 2009 all of which are incorporated herein by reference in their entirety.

FIELD OF THE INVENTION

The present invention relates to the reduction of the misting of printing inks in high speed offset printing processes.

BACKGROUND OF THE INVENTION

"Misting" is the term popularly applied to the formation of small airborne droplets of ink that are ejected from the rotating rollers of printing machines. Misting not only wastes ink, it represents a health hazard to workers in the printing industry and requires extraordinary measures in order to keep the printing presses and the rooms in which they are housed clean.

Many workers have investigated the problem and many solutions have been proposed. Some of these are described, for example, in Newspaper Techniques, April 2002, 52-54; GATFWorld, March/April 1996, 8(2), 11, 12; "Factors affecting the misting of UV curable inks", Hutchinson I D; Richards A M [Paper presented at RadTech Europe, Maastricht, 25-27 September 1995, 231-241]; American Ink Maker, March 1979, 57(3), 47, 48, 52, 54, 108-112. As can be seen, for example, in the last of these documents, a large number of factors are implicated in misting and many different expedients have been adopted in an effort to reduce or eliminate it, including altering process variables, environmental conditions and various elements of the ink composition.

Much of the prior art has emphasized specific compositional changes effect the degree of misting. Some discuss misting as a runnability issue. See, for instance, US Patent Publications 2005/209397, and 2006/0213393; U.S. Pat. Nos. 4,310,356, 5,000,787, and 5,763,565 and WO 2006/042033. Likewise, many articles focus their attention on finding ways to reduce the misting. See, e.g., Traber, K., Has, M. and Dolezalek, F., "Heat balance in web offset printing units," Taga Proceedings, 279-296 (1993); Voet, A., "Ink misting and its prevention," American Ink Maker, 34, 32 (1956); Leach, R. H., Pierce, R. J., Hickman, E. P., Mackenzie, M. J. and Smith, H. G., The Printing Ink Manual, 5th Ed. (Blueprint, London, 1993); Christiansen, S., "Resins are gaining weight," American Ink Maker, 73, 13, 14-60 (1995); James, D. F., Yogachandran, N. and Roper, J. A., III, "Fluid elasticity in extension, measured by a new technique, correlates with misting," TAPPI Adv. Coating Fundamentals Symp., 8th, Chicago, Ill., 166-171 (May 8-10, 2003); Ascanio, G., Carreau, P. J. and Tanguy, P. A., Non-Newtonian effects on forward deformable roll coating at high speed, In (Eds.) (University Report 833, Paprican, 2003); and McKay, R. C., "Effectiveness of pigments in suppression of misting of lithographic printing inks," FATIPEC Congress, Paris, France, 22, 137-150 (1994).

Selecting or designing an ink that does not exhibit such a propensity to misting has been a hit or miss proposition since there are no guidelines to help to identify in advance those inks exhibiting reduced misting. This has become more of a problem in recent years due to advances in printing technology.

Recent technological advancements have included the manufacturing and employment of printing presses that operate at high speeds, that is, routine speeds of higher than about 10 m/s (36 km/h or 22.4 miles/h) and up to 15 m/s. This is partly a response to the increased demand for on-time information delivery to more and more customers. These new high speed presses present challenges to the ink manufacturers as their products are being subjected to new stresses during flow. Previous ink formulations that worked well can be unsuitable at the higher speeds. In addition, as the printing machines have begun to operate at increasingly high speeds, the problem of misting has become more pronounced.

A similar misting problem is found in paper coating industry since metering-size presses works on the very same principle of transferring coating color (instead of ink) onto a substrate (paper, cardboard, etc.).

SUMMARY OF THE INVENTION

A method has been discovered which permits forecasting or selecting a printing composition that will display a reduced degree of misting under high speed offset printing conditions. It involves selecting three or more temperatures which substantially cover the anticipated range of printing operation temperatures, conducting rheological testing at those temperatures to determining the value of the rheological parameters viscous modulus, phase angle and slope of phase angle-temperature line, and selecting or formulating a composition having a combination of phase angle, viscous modulus, and phase-angle slope which reflect that the viscoelastic properties will not substantially degrade over the range of printing temperatures. A printing ink or coating composition that has these characteristics will exhibit reduced misting when used in high speed printing apparatus.

The invention will be better understood by those of skill in this art from the following detailed description and drawings.

DETAILED DESCRIPTION OF THE INVENTION

Figure 1:
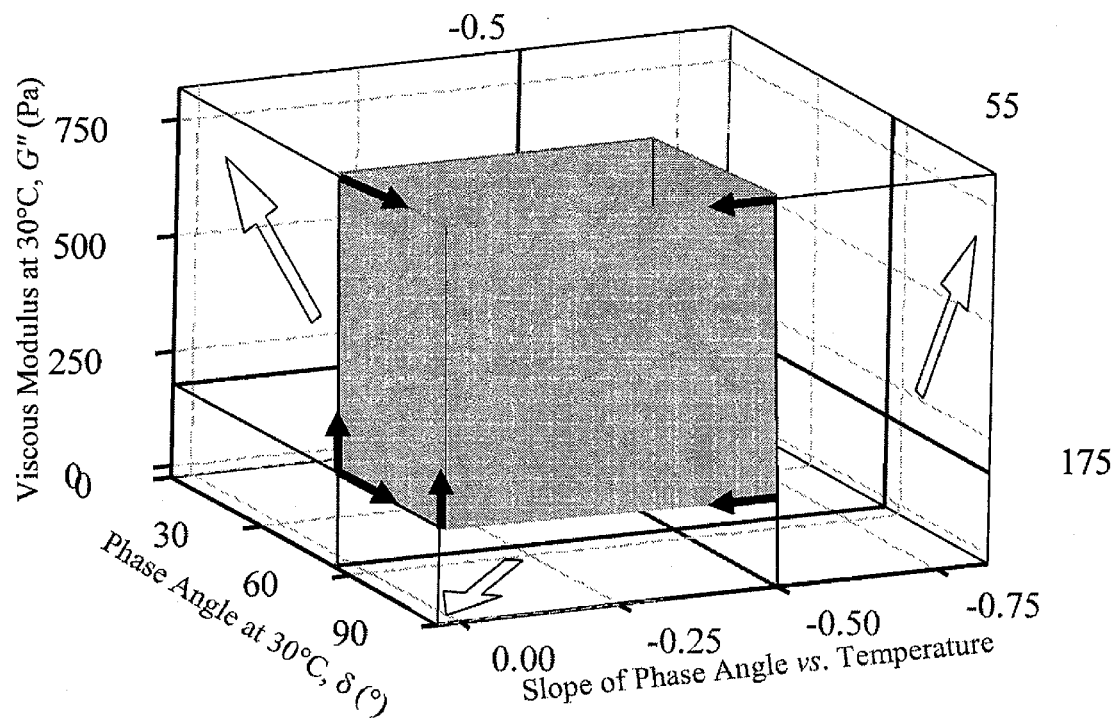
FIG. 1 shows the parameter space that the method described below defines for low mist inks at high speed printing presses, as explained in the Examples below.

In accordance with the present invention, a proposed or current ink or coating composition is rheologically tested to identify three parameters, namely viscous modulus, phase angle and slope of phase angle-temperature line, at conditions encountered during printing around where the structural behavior of the ink or coating changes. In order to identify those conditions, rheological testing is conducted at three or more temperatures that substantially cover the anticipated (intended) range of printing operation temperatures expected to be encountered during printing. Those temperatures may differ depending on the particular printing equipment employed but the anticipated range will be known to those skilled in the printing art. While more than three temperatures can be selected, three will usually suffice.

Two of the selected temperatures should be at the respective ends of the printing operation temperature range. Each of these may be somewhat inside or outside the range, but temperatures just inside the range are preferred. The other temperature(s) will be between these end point temperatures. When three temperatures are being used, the third temperature is preferably in the vicinity of the middle of the range but it is not necessary to be at the exact center. For example, if the anticipated printing operation temperature range is 30° to 50° C., the selected temperatures can be 30° C., 40° C. and 50° C. If the range was 25-70° C., the selected temperatures could be 28° C., 50° C. and 71° C.

The rheological parameters determined are the viscous modulus (also known as loss modulus), the phase angle, and the slope of the best line drawn through graphed data of phase angle vs. temperature. The collected data provides information useful to determine if an ink or coating composition with conventional rheological properties showing a decrease in dynamic moduli as the temperature increases will have an acceptable misting performance. Inks or coating compositions showing unusual behaviors due to phase separation or phase transition due to temperature effects may not be capable of being evaluation in accordance with the invention.

The rheological testing can be carried out on any rheometer capable of performing oscillatory shear measurements. For instance, a device with a parallel plate geometry of 40-mm diameter or a device with cone-and-plate geometry, e.g. 40-mm diameter and 2° cone angle, can be used but other devices can also be employed. In the work described below, a AR-1000 rheometer from TA Instruments with the parallel plate geometry was used.

Usually a preconditioning operation is effected so that all the testing will start from the same reference structural configuration. This can be done, for example, using an oscillatory time sweep test at a fixed frequency, such as 1 Hz, and a fixed strain amplitude, such as 200% for 150 seconds, followed by a rest (equilibrium) period, such as 150 seconds. Then a strain amplitude sweep which is wide enough that the maximum (peak) in the graph of the elastic modulus (G') vs. strain amplitude can be observed is effected. For instance, the strain amplitude sweep can be from 0.02% to 200% at a fixed frequency of 1 Hz. The point on the side of the graph with the larger strain amplitude having an elastic modulus of at least 95% of the maximum is the "characteristic point" of the ink or coating at the tested temperature. The concept of "characteristic point" is well known to those skilled in the rheological testing art. Other information can be obtained from the data at this point using a linear regression between the desired material property (e.g., viscous modulus or complex viscosity, etc.) and the elastic modulus. The phase angles at the characteristic points of each temperature is used to determine the slope of the best line obtained when graphing the phase angles with respect to temperature, and that slope is hereinafter termed the "phase-angle slope".

After the data is collected, the value of the viscous modulus and the phase angle at the lowest temperature tested, and the phase-angle slope, are determined. It has been found that an ink or coating composition with acceptable misting performance simultaneously has a viscous modulus, phase angle and a phase-angle slope that indicate the viscoelastic properties will not substantially degrade over that entire range of temperatures. However, an inadequate value of one or two of these makes it likely that the viscoelastic properties will substantially degrade over the encountered printing temperatures.

The minimum values in the case of compositions that are not going to be employed to cover the entire surface of a substrate, i.e., an ink, are a viscous modulus (G") of about 150 Pa, a phase angle ($\delta$) of about 55° and a phase-angle slope of −0.50°/° C. Preferably, the test data will simultaneously show a viscous modulus larger than about 175 Pa, a phase angle larger than about 55° and a phase-angle slope larger than −0.45°/° C. Most preferably, the test data will simultaneously show a viscous modulus larger than about 200 Pa, a phase angle larger than about 55° and a phase-angle slope larger than −0.40°/° C.

Coating compositions designed to cover the entire surface of a substrate often contain additional constituents due to the desire to coat an entire surface. The minimum values of the rheological parameters may be the same as in the case of an ink or may be different, but in either case, they exceed values that indicate the viscoelastic properties will substantially degrade over that entire range of temperatures. The determination of those minimum values can be easily found by those skilled in this art based on the above description.

The ability to predict the misting properties of the ink or coating permits the printer or composition manufacturer to select which of a number of available compositions will most likely be appropriate under high speed conditions insofar as misting is concerned. It also allows a formulator to evaluate the misting behavior of a proposed formulation without having to make a large enough quantity to conduct printing trials, and if necessary, to make a series of adjustments in the formulation and do new evaluations also without having to make a large enough quantity to conduct printing trials.

EXAMPLES

The rheological tests as described above were performed on a panel of 55 commercially available inks at 30° C., 40° C. and 50° C. FIG. 1 shows the parameter space in which the viscous modulus would be larger than about 150 Pa, the phase angle would be larger than about 55° and the phase-angle slope would be larger than −0.50°/° C. It was found that those inks in the test panel that had a low degree of misting on high speed printing presses had test results inside that parameter space.

Figure 2:
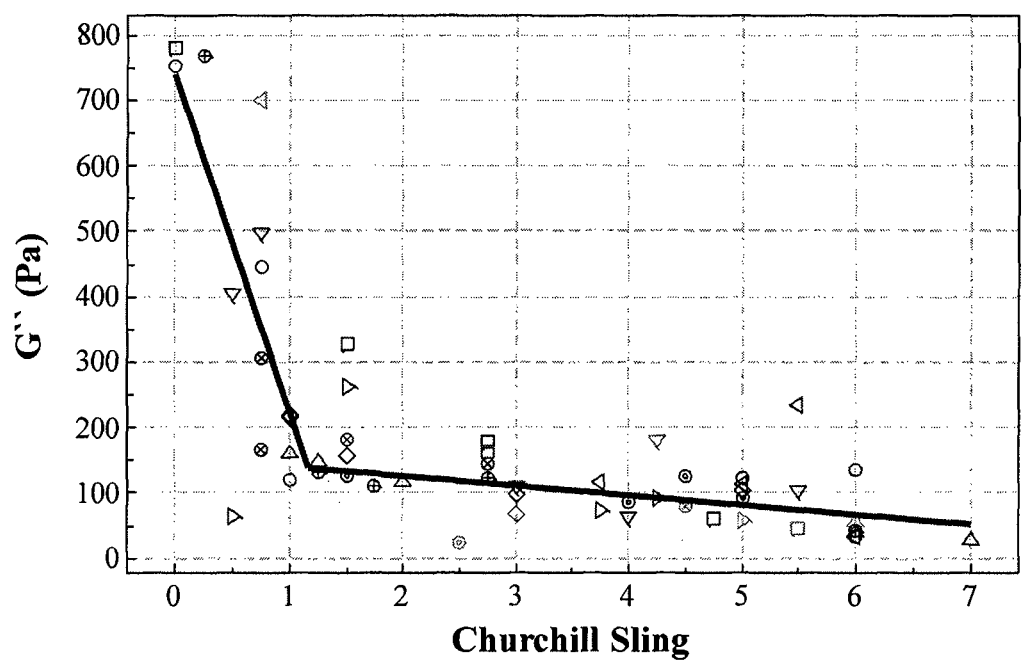
FIG. 2 is a graph of viscous modulus G" vs. Churchill sling data, a measure of misting.

FIG. 2 is a graph of viscous modulus G" vs. "Churchill sling" data, i.e., data from the sling of a inkometer made by Churchill. The figure shows a clear relationship between these two parameters. The data was further divided into two groups: (1) inks with phase angles at all three test temperatures being larger than 45° and (2) inks with at least one phase angle equal or less than 45°. The phase angle of 45° is the boundary between materials whose viscous modulus is larger than its elastic modulus (more viscous than elastic or liquid-like behavior), and materials whose elastic modulus is larger than its viscous modulus (more elastic than viscous or solid-like behavior). This data showed that when the phase angle was more than 55°, the viscoelastic properties would not substantially degrade over that entire 30° to 50° temperature range. Interestingly, the inks with liquid-like behavior had a slope of the phase angle variation with temperature that was much smaller than the other group and were more resistant to change due to temperature. This shows that the response of the ink or coating material to temperature is important.

Laboratory tests were conducted on five commercial inks and the results are shown in Table 1 below. Mist levels were rated on a scale of 1 to 5 with only level 1 being an acceptable low misting ink while mist levels larger than 1 are not acceptable mist levels.

TABLE 1

| Ink | Mist Level | T (° C.) | $\delta$ (°) | G" (Pa) | G' (Pa) |
|-----|------------|----------|--------------|---------|---------|
| A   | 5          | 30       | 63.1         | 231.3   | 117.3   |
| A   |            | 40       | 44.6         | 276.0   | 280.2   |
| A   |            | 50       | 29.7         | 319.9   | 560.7   |
| B   | 3          | 30       | 65.4         | 124.2   | 57.0    |

TABLE 1-continued

| Ink | Mist Level | T (° C.) | δ (°) | G'' (Pa) | G' (Pa) |
|---|---|---|---|---|---|
| B |   | 40 | 61.3 | 68.6 | 37.6 |
| B |   | 50 | 60.1 | 38.1 | 21.9 |
| C | 5 | 30 | 55.9 | 85.2 | 57.7 |
| C |   | 40 | 48.6 | 50.8 | 44.8 |
| C |   | 50 | 42.0 | 30.0 | 33.3 |
| D | 1 | 30 | 61.0 | 370.5 | 205.4 |
| D |   | 40 | 60.2 | 168.5 | 96.5 |
| D |   | 50 | 55.7 | 89.2 | 60.9 |
| E | 5 | 30 | 44.5 | 457.1 | 465.6 |
| E |   | 40 | 33.7 | 434.8 | 652.6 |
| E |   | 50 | 25.7 | 402.2 | 836.6 |

Figure 3:
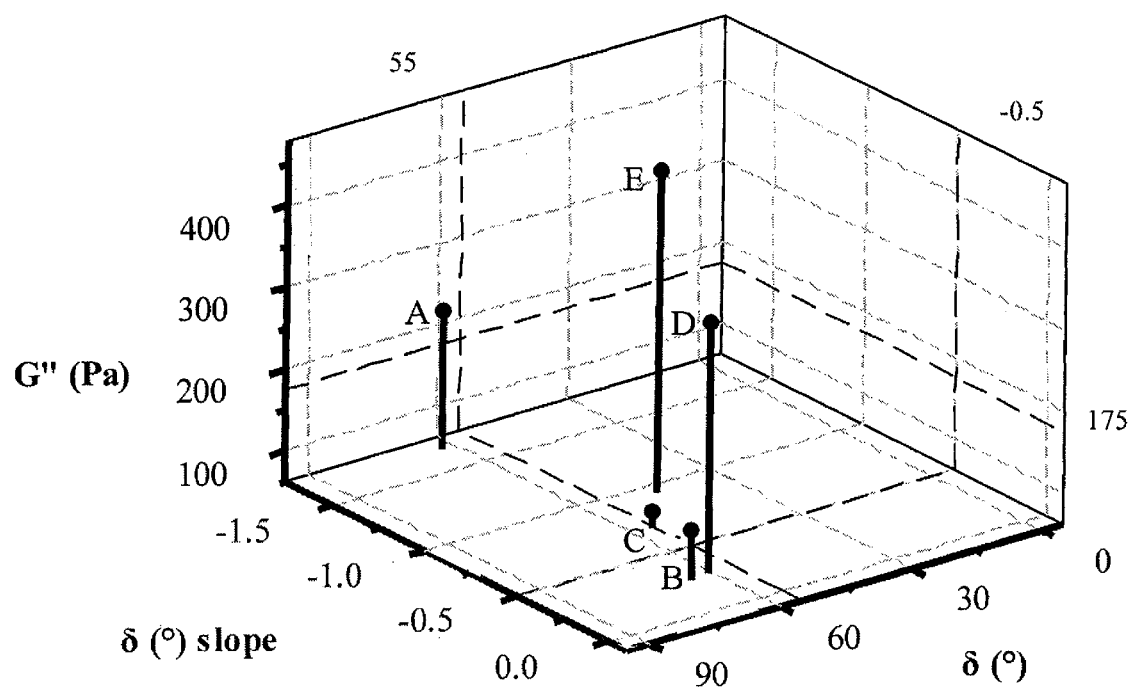
FIG. 3 shows a validation of the method with production inks with known misting performance.

Table 1 shows that ink D is the only ink which had all three parameters which showed that the viscoelastic properties will not substantially degrade over that range of temperatures. The viscous modulus at 30° C. was 370.5 Pa (larger than 150 Pa), the phase angle at 30° C. was 61° (larger than 55°), and the slope of phase angle was −0.27 (larger than −0.5). As shown in FIG. 3, only ink D fell within the three dimensional space shown in FIG. 1 This serves to further confirm the method of this invention.

Ink A of Table 1 shows that while at 30° C., the viscous modulus and the phase angle are within the permitted range (231.3 Pa>150 Pa and 63.1°>55°, respectively) the slope of phase angle (−1.67) is much smaller than −0.50. The observed misting level of 5 shows poor misting performance is obtained.

In Ink B, the viscous modulus at 30° C. was 124.2, i.e., smaller than the minimum value of 150, even though the phase angle at 30° C. and the slope of the phase angle values were greater than the required minimum values. The misting level was 3.

The viscous modulus at 30° C. (85.2) and the slope of the phase angle (−0.70) of Ink C were smaller than required while the phase angle (55.9°) was greater than the minimum. The observed misting level was 5.

Ink E had an above minimum value viscous modulus at 30° C. (457.1) but the values of the phase angle at 30° C. (44.5) and the slope of the phase angle (−0.94) below minimum values. The observed misting level was 5.

To additionally confirm the method of the invention, a series of commercial inks which were especially designed for use on waterless printing presses and which were known to exhibit low misting were subjected to the rheological testing. It was found that all had a viscous modulus larger than about 150 Pa, a phase angle larger than about 55° and a phase-angle slope larger than −0.50°/° C. In particular, all of these inks showed positive phase-angle slope, as opposed to the other tested inks which had negative phase-angle slope (decreasing phase angle with increasing temperature). The larger the phase-angle slope, the lower is the misting propensity of the ink.

Various changes can be made in the invention described above without departing from the spirit and scope thereof. The various embodiments set forth were for illustration purposes only and are not intended to limit the invention.

What is claimed is:

1. A method of selecting a printing composition with a reduced degree of misting when being printed comprising
    obtaining values of the rheological parameters viscous modulus, phase angle and phase-angle slope of the printing composition, wherein the phase-angle slope is the slope of a phase angle-temperature line at the characteristic point of each of three or more temperatures which substantially cover the intended range of printing operation temperatures, and the viscous modulus and phase angle are the respective values at the lowest of the temperatures, and
    selecting a composition whose viscous modulus, phase angle and phase-angle slope values simultaneously reflect that the viscoelastic properties will not substantially degrade over the range of temperatures.

2. A method according to claim 1, wherein the temperatures are 30° C., 40° C. and 50° C.

3. A method according to claim 1, wherein the printing composition selected has a phase angle of at least 55°, a viscous modulus of at least 150 Pa, and a phase-angle slope of at least −0.5°/° C.

4. A method according to claim 1, wherein the printing composition selected has a viscous modulus of at least 174 Pa, and a phase-angle slope of at least −0.45°/° C.

5. A method according to claim 1, wherein the printing composition selected has a viscous modulus of at least 200 Pa, and a phase-angle slope of at least −0.40°/° C.

* * * * *